(No Model.)
T. H. HERNDON.
WEIGHING SCALE.
No. 302,402. Patented July 22, 1884.
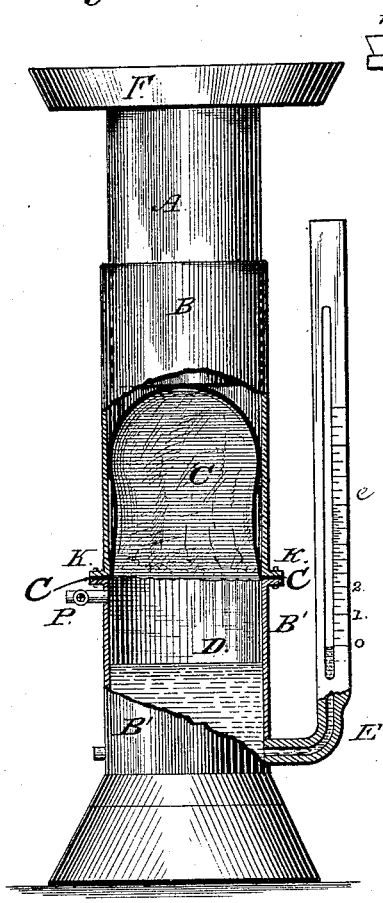
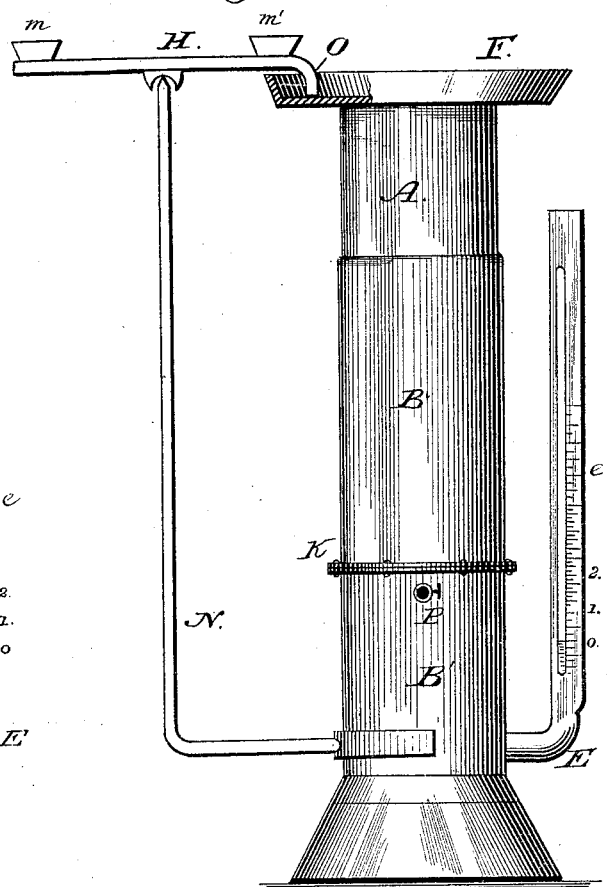
WITNESSES:
Fred. G. Dieterich
W. X. Stevens
INVENTOR:
T. H. Herndon
BY Munn & Co.
ATTORNEYS.

UNITED STATES PATENT OFFICE.

THOMAS H. HERNDON, OF WEST POINT, MISSISSIPPI, ASSIGNOR OF ONE-HALF TO GEORGE P. HERNDON, OF SAME PLACE.

WEIGHING-SCALE.

SPECIFICATION forming part of Letters Patent No. 302,402, dated July 22, 1884.

Application filed February 4, 1884. (No model.)

*To all whom it may concern:*

Be it known that I, THOMAS H. HERNDON, a citizen of the United States, residing at West Point, in the county of Clay and State of Mississippi, have invented certain new and useful Improvements in Weighing-Scales, of which the following is a description.

This invention relates to that class of weighing devices which register upon a scale the weight of any article placed on the scoop; and its object is to weigh accurately and quickly, and to do away with movable weights, which are liable to be changed.

To this end my invention consists in the construction and combination of parts forming a weighing-scale, hereinafter described and claimed, reference being had to the accompanying drawings, in which—

Figure 1 is a side elevation of my invention, part in section; and Fig. 2 is a similar side elevation of the same, showing a common balance-scale connected therewith.

A represents a light cylindrical tube closed at its lower end and carrying a scoop, F, on its upper end to receive the material to be weighed. This tube fits freely in another tube, B, to rise and fall therein.

B' is another tube, having a bottom forming a cup in which a quantity of mercury, D, or other suitable fluid is held. The two tubes B and B' are secured together at K with screws, forming the body of my weighing-scale.

C is a flexible india-rubber bag, placed mouth downward, the circumference of its mouth being secured in the joint K. This bag is to be distended with air to sustain it in place.

P is a stop-cock, into which air may be blown to distend the bag. The air will fill the space above the mercury D and within the bag.

E is a glass tube rising from the lower part of the mercury-cup. In its normal condition the mercury will stand at the same height in both the cup B' and the tube E; but when the scoop F and tube A are in place, resting on the bag C, the air therein will press down upon the mercury in cup B', thereby raising it a little in tube E. At this point, at the top of the mercury in tube E, the 0-mark of the registering-scale should be placed in making the scale. Above this the scale is graduated to any denomination desired, such as pounds, ounces, &c. Then when any material to be weighed is placed in the scoop F the mercury will be pressed up in tube E to the figures on the scale $e$, indicating the weight thereof. If it be intended to weigh very heavy merchandise, the tube E will be very small relatively to the diameter of cup B'. If the internal diameter of cup B' were ten times that of tube E, its area would be one hundred times as much. Therefore one ounce of mercury standing in tube E would balance one hundred ounces standing at the same level in cup B'. Then if something weighing one hundred ounces were placed in the scoop F, it would force another ounce of mercury into tube E, thereby doubling the first height of its column, while the top of the mercury in the cup B' would descend one one-hundredth of the first height shown. On this principle scales may be made to weigh with the greatest degree of fineness and accuracy, or to weigh heavy articles, by properly proportioning the various parts to the duty to be performed. Of course the air in the bag C will be compressed when under weight; but it will nevertheless transmit to the mercury below it the exact weight resting on it.

The bag may be provided with a stop-cock at P by which to fill it. The office of this bag is to support and give motion to the scoop F and its tube A, so as to convey all the weight placed in the scoop, by means of the air inside, to the mercury without that friction which an air-tight-fitting portion would have, for such friction would be a variable quantity, interfering with accurate weighing.

By means of the modification shown in Fig. 2, I adapt my scale to register the weight of articles weighed on the common balance-beam, H. In this case $m\ m'$ are two plates or scoops on the balance-beam H, and I provide one of them, $m'$, with an extension, O, to rest in the scoop F. Now, the weight of any article in scoop $m'$ will be indicated on the scale $e$. Again, supposing the limit of scale $e$ to be ten pounds and the article to be weighed were more than that. Then we place a ten-pound weight in plate $m$, which will balance ten pounds of the weight in plate $m'$, and the scale $e$ will indicate the remaining amount to be added to said ten pounds as the whole weight of article.

N represents a bracket secured to the side of the body B' to support the auxiliary beam H. By means of this auxiliary beam and one or two large weights of known value, and my registering-scale to note the exact balances, an accurate scale of great range is provided.

What I claim as my invention, and wish to secure by Letters Patent, is—

1. The combination, with a fluid-holding cup, a tube, and a scale connected therewith, of an inverted bag secured at its mouth to said cup, a weighing-scoop, and means for guiding the same to rest on the said sack, substantially as shown and described.

2. The combination, with the cup B', the tube E, and scale c, of the tube B, secured to cup B', the bag C, having its mouth secured between tubes B and B', and the scoop F, provided with the tube A, loosely fitting tube B, as shown and described.

3. The combination, with a weighing-scale consisting of a fluid-cup, a tube, and a scale connected therewith, a bag secured mouth downward to said cup, and a scoop supported upon said bag, of a balance-beam, means for holding articles thereon to be weighed, and means for supporting one end of said beam on the scoop of the first-named weighing-scale, all substantially as shown and described.

THOS. H. HERNDON.

Witnesses:
JNO. A. CAROTHERS,
JNO. W. BRADY.